J. W. WITSELL.
ADDING MACHINE.
APPLICATION FILED MAY 13, 1914. RENEWED APR. 21, 1916.
1,190,058.
Patented July 4, 1916.
2 SHEETS—SHEET 1.
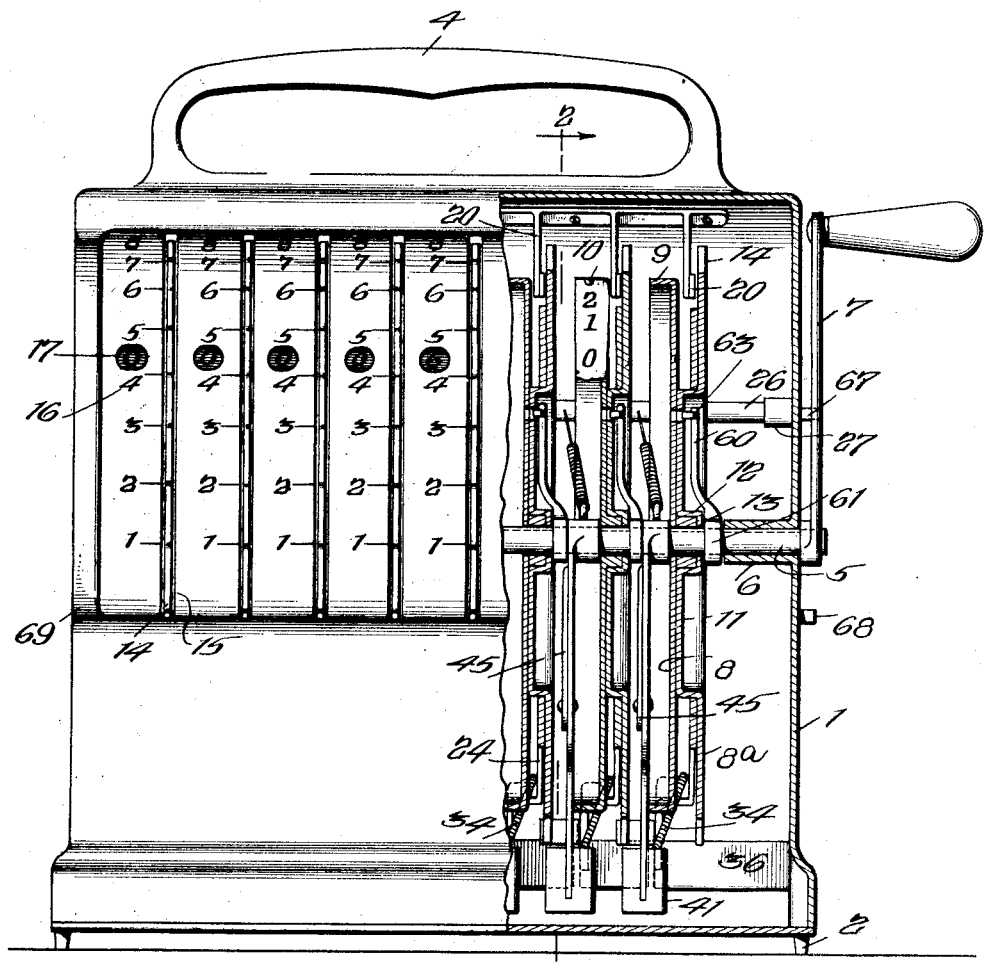
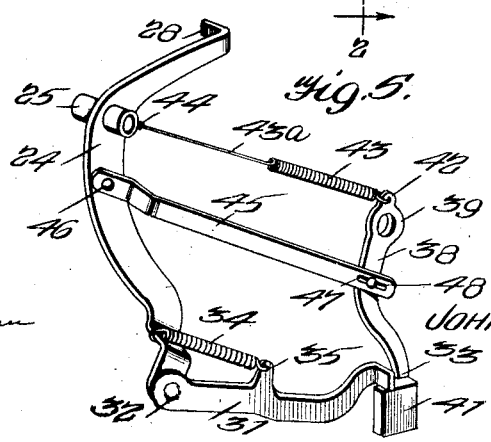
WITNESSES
INVENTOR
JOHN W. WITSELL,
BY
ATTORNEYS J. W. WITSELL.
ADDING MACHINE.
APPLICATION FILED MAY 13, 1914. RENEWED APR. 21, 1916.
1,190,058.
Patented July 4, 1916.
2 SHEETS—SHEET 2.
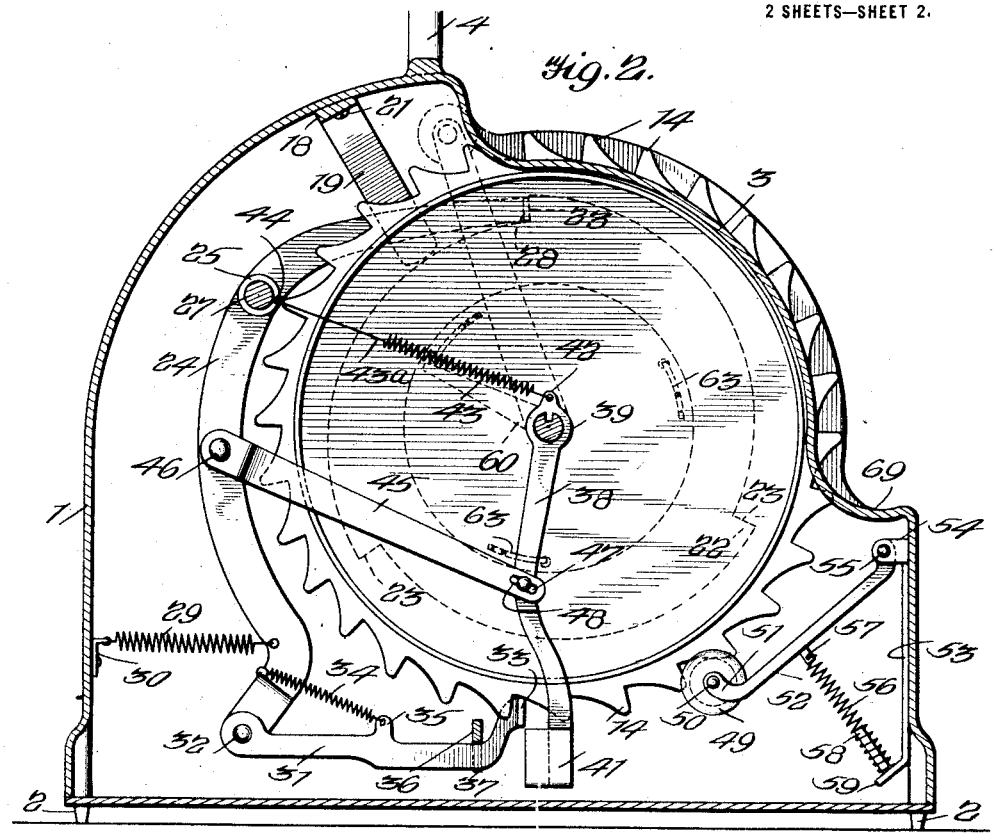
WITNESSES
INVENTOR
JOHN W. WITSELL,
BY Munn & Co.
ATTORNEYS

UNITED STATES PATENT OFFICE.

JOHN WARING WITSELL, OF CHARLESTON, SOUTH CAROLINA.

ADDING-MACHINE.

1,190,058.   Specification of Letters Patent.   Patented July 4, 1916.

Application filed May 13, 1914, Serial No. 838,276. Renewed April 21, 1916. Serial No. 92,759.

*To all whom it may concern:*

Be it known that I, JOHN W. WITSELL, a citizen of the United States, and a resident of Charleston, in the county of Charleston, and State of South Carolina, have invented a new and useful Improvement in Adding-Machines, of which the following is a specification.

My invention is an improvement over my prior Patent No. 1,035,066 granted August 6, 1912, and the present invention has for its object to provide in a device of the character specified, spring mechanism arranged adjacent to each number wheel for operating the succeeding wheel, the said mechanism being placed under tension by the movement of the preceding wheel, and released at predetermined intervals by the said preceding wheel, to cause the spring to move the succeeding wheel, without any strain on the preceding wheel, and wherein other mechanism is provided for positively preventing excess movement of each wheel.

A further object of the invention is to provide a new and improved mechanism for clearing the wheels, that is, for returning the wheels to zero position, the said mechanism being positive in its action.

In the drawings:—Figure 1 is a front view of the improved machine with parts broken away, Fig. 2 is a section on the line 2—2 of Fig. 1, looking in the direction of the arrows adjacent to the line, Fig. 3 is a side view of one of the number wheels, looking at the opposite side from Fig. 2. Fig. 4 is a section on the line 4—4 of Fig. 3, and Fig. 5 is a perspective view of the holding mechanism for preventing excess movement of the wheels.

The present invention is an improvement over my prior Patent, #1,035,066, granted August 6, 1912, and the invention comprises a casing 1 of suitable material and dimensions, the casing having feet 2 for supporting the same, and at its front the casing is provided with a depressed portion 3, which is arc-shaped in cross section, and extends near the entire length of the casing. A handle 4 is also provided for convenience in handling the casing, and a shaft 5 is journaled longitudinally of the casing, in bearings 6, extending inwardly from the ends of the casing. One end of the shaft extends beyond the casing, and a crank 7 is fitted on the said end for turning the shaft. A series of number wheels, 8 in the present instance, is arranged on the shaft in spaced relation, and each of the wheels is sectional, consisting of sections 8 and $8^a$, respectively.

The section 8 is in the form of a disk having a central opening for the shaft and provided with a marginal laterally extending flange 9 and upon the flange 9 of each of the sections 8 is arranged three series of consecutively arranged numerals 10. Each series consists of 10 numerals, from 1 to 0, and the series are similarly arranged on all of the wheels. The section $8^a$ of each wheel has a portion at its center offset laterally toward the section 8, as indicated at 11, the said portion 11 being annular so that a hub 12 is formed at the center of the section. The hub fits upon the shaft, and a collar 16 is arranged within the hub filling the space between the sections 8 and $8^a$ at this point. At its periphery the section $8^a$ has a series of teeth 14, the teeth extending entirely around the wheel as shown more particularly in Fig. 3, and the said teeth are adapted for engagement by the fingers of the operator to turn the wheels. The portion 11 of each section $8^a$ abuts against the adjacent face of the section 8, and the sections are secured together in any suitable manner at this point. The casing is provided with a slot 15 at the section $8^a$ of each wheel, and the teeth 14 of the wheels extend through the slots. Adjacent to each wheel a series of numerals 16 is arranged on the outer face of the casing, the numerals being arranged consecutively and running from 1 to 0, and near the center of each series of numerals the casing is provided with an opening 17, for permitting the numerals on the flange 9 to be seen. The opening 17 may be covered with a transparent plate if desired, for instance, glass, celluloid or the like, and it will be noticed that the series 16 of numerals are arranged to read from below upward, and the opening 17 is between the numerals 4 and 5. A bar 18 is secured to the inner surface of the casing at the rear of the casing and at the top, and the said bar is provided with a lateral extension 19 for each number wheel. Each of the extensions 19 extends radially of the adjacent number wheel on the face of the section $8^a$, adjacent to the section 8, and each of the extensions is provided with a facing plate 20 of leather or like hard fibrous material, at the face adjacent to the section 8ª.

The bar 18 is secured to the casing by screws 21 or the like, and the facing plates 20 are adapted to engage the wheels to limit their movement in either direction. Each of the extensions extends between the sections of the wheel, the plate 20 being adjacent to the section 8ª, and the opposite face of the extension being adjacent to the section 8. The offset portion 11 of each of the sections 8ª has its peripheral surface shaped eccentrically, as shown in Figs. 2 and 3, to form three cams 22. The shoulder 23 which separated the highest portion of each cam from the lowest point of the succeeding cam are radial to the wheel, and are spaced apart from each other at angles of 120°, and the said shoulders face rearwardly at the top of the number wheels.

An arc-shaped lever 24 is arranged adjacent to each of the number wheels except the last, each lever having a transverse bearing 25, intermediate its ends, which is journaled upon a shaft 26, journaled in bearings 27, extending inwardly from the ends of the casing. The levers 24 are arranged with their convex edges rearwardly and each of the said levers is provided at its upper end with a lateral lug 28. The lugs 28 are adapted to engage the cams 22 of the number wheels, the said lugs resting upon the cams, and as each number wheel is moved, the lugs 28 ride upon the cams until the said lugs pass off the highest portion of the cam, moving down the face of the shoulder 23. A coil spring 29 is arranged between the lower end of each lever, and an angle plate 30 secured to the rear wall of the casing and the spring acts normally to draw the lower end of the lever rearwardly. A pawl arm 31 is pivoted to the lower end of each lever as indicated at 32, the said pawl arm extending forwardly from the lever, and each of the pawl arms is provided at its front end with a lateral lug 33, the said lug being offset upwardly from the body of the pawl arm and extending laterally in position to engage the teeth of the succeeding wheel. A coil spring 34 is arranged between the lever 24, and an upwardly extending lug 35, on the pawl arm, and the spring acts normally to hold the lug 33 in engagement with the teeth 14 of the succeeding wheel. As each number wheel rotates forwardly the lug 38 of the lever adjacent thereto rides upon the cam until the shoulder 23 between the said cam and the succeeding cam is reached, and as the lug rides upon the cam the lower end of the lever is swung forwardly, placing the spring 29 under tension.

It will be understood that the shoulders 23 of the respective wheels are between the series of numerals on the flange 9, and as each wheel is turned to bring a 0 of a series opposite the opening 17 adjacent to the wheel, the lug 28 slips off a shoulder 23, and the spring 29 connected therewith swings the lower end of the lever rearwardly. The lug 33 of the pawl arm connected to the lever is in engagement with the teeth of the succeeding wheel, and as the lever is swung rearwardly by the spring, the pawl arm 31 will move the succeeding wheel a distance of one tooth; thus the arms 24, 31, 29 operated by the cams 22 constitute the "carry-one" mechanism. Each wheel operates this mechanism, causing it to store up power to operate the succeeding wheel. When the units wheel for instance, has been turned over a distance corresponding to one series of numbers the said wheel can no longer register the amount, and it is necessary to move the tens wheel a distance of one tooth to register the proper amount. The upward movement of the pawl arms 31 under the influence of the springs 34 is limited by a stop bar 36, the said bar being arranged transversely of the casing above the arms and secured to the ends of the casing, and the bar is notched on its under face as indicated at 37 at each of the pawl arms, and the arms fit in the notches.

It has been found in practice that the levers 24 and the pawl arms 31 tend to impart excess movement to the number wheels, and a momentum arrester is provided for each number wheel, coöperating with the adjacent pawl arm 31 to positively lock the wheel against movement. Each of the said arresters comprises an arm 38, having a bearing 39, fitting the shaft 5, and keyed thereto as indicated at 40 in Fig. 2, and each of the arms is provided at its outer end with a block or weight 41. Each arm is provided with a perforated lug 42, extending on the opposite side of the shaft from the arm, and a coil spring 43 is connected with each lug. One end of the spring is connected to the opening of the lug and the other end is connected by a wire 43ª to an eye 44 on the bearing 25 of the adjacent lever 24. The spring 43 acts normally to swing the weight 41 forwardly, and the movement of the arm 38 with respect to the lever 25 is limited by means of a link 45. One end of the link is offset laterally and pivoted to the lever 24 of the preceding wheel, as indicated at 46, and the other end of the link is provided with a longitudinally extending slot 47, through which extends a headed pin 48 on the arm 38 of the succeeding wheel from that which the lever 24 engages.

Other mechanism is also provided in connection with each of the number wheels for steadying the motion thereof and for securely centering the wheel after it has been turned. The said mechanism comprises a grooved roller 49, journaled on a pin 50, which connects the arms 51 of a fork on the end of a lever 52. Each lever is supported by a bracket 53, secured to the front face of the casing below the arc-shaped portion 3, and each bracket is provided at its upper end with a pair of spaced lugs 54 between which the end of the lever remote from the roller is pivoted as indicated at 55.

The rollers 49 are pressed into engagement with the respective wheels by means of coil springs 56, each spring seating at one end around a laterally extending pin 57 on the adjacent lever 52 and at the other end around a similar pin 58, extending laterally from an angular lug 59 on the bracket. The springs 56 are just strong enough to hold the rollers in engagement with the teeth, and it will be evident that in addition to their function as holding pawls, the rollers have the additional function of centering the wheels. Each roller tends to take an exact position between two teeth, as shown in Fig. 2, and it is evident that should the wheel be moved a little too far or not quite far enough the roller would center the wheel so that the numerals will appear at the exact centers of the openings 17.

Before using the improved machine, it is necessary that it be "cleared," that is, that one of the characters of each wheel be at the adjacent opening 17. In order to clear the wheel, it is also necessary to rotate the shaft 5 by means of the crank 7, in a reverse direction. It will be noticed from an inspection of Figs. 2 and 3 that the teeth 14 of the wheels have one face almost radial to the wheel, the other face being inclined. The radial face of each tooth is rearward at the upper part of the wheel, the inclined face being forward.

Adjacent to each wheel an arm 60 is arranged on the shaft 5, each arm having a bearing 61 engaging the shaft and keyed thereto as shown at 62 in Fig. 3. The outer end of each of the arms is offset to lie within the offset portion 11 of the adjacent section 8ᵃ of the number wheel as shown in Fig. 1, and the free end of each arm is in position to engage a spring latch on the adjacent face of the wheel. Each of the latches is in the form of a strip or plate 63, one end of which is secured to the wheel within the offset portion 11, by means of screws 64 or the like. The plate is bent outwardly away from its connection with the wheel to lie at an acute angle with respect to the plane of the wheel as shown more particularly in Fig. 4, and the extremity is then bent to lie perpendicular to the plane of the wheel as indicated at 65. At this point the wheel has a transverse opening 66 through which the angular portion 65 may pass. When the number wheels are in use in adding, the springs engage the arms 60 first at the connected end, and it will be evident that as the wheel continues to move in this direction the spring will be depressed against the adjacent face of the wheel, the angular portion 65 entering the opening 66 of the wheel so that all of the arms may freely pass the springs. Each wheel is provided with three springs, and the springs are so arranged with respect to the wheels and the several series of numerals thereon that when the crank arm 7 is in a certain predetermined position and all of the wheels have a spring with its portion 65 contacting with the adjacent arm 60 of the shaft, a character 0 will be at the opening 17 of the wheel. All of the arms 60 are in register on the shaft, and the springs 63 are similarly placed on all of the wheels. Stops 67 and 68 are provided on the end of the casing to limit the movement of the crank arm 7 and of the shaft 5.

The operation of the machine, as a whole, is as follows:—Should it be desired for instance, to add the sums 64523 and 72987, the operator commencing with the units wheel at the right (after the machine has been cleared) will engage his finger with that tooth of the units wheel which is in register with the numeral 3 on the face of the casing at the right of the wheel and will draw the wheel forward and downward until his finger engages the concave surface 69, which is at the junction of the lower part of the arc-shaped portion 3 and the front of the casing. At the tens wheel he will engage the tooth at the numeral 2, the hundreds wheel at the numeral 5, the thousands wheel at the numeral 4, and the ten-thousands wheel at the numeral 6. There will now appear at the opening 17 of the five wheels named the sum 64523. To complete the operation the operator will engage with his finger that tooth of the units wheel which is in register with the numeral 7 on the indicating scale at the left of the said wheel, and will move the wheel until his finger engages the concave surface 69.

Since there are but ten numerals and as a consequence ten teeth for each series of numerals on a wheel, and the units wheel has already been moved a distance of four teeth including the 0, a further movement of seven teeth will complete a series of numerals on this wheel, and in addition there will be another tooth in the next series. The next tooth will be opposite the numeral 0 of the succeeding series and the numeral 0 will appear at the units wheel opening 17.

As that tooth of the units wheel which is at the numeral 0 reaches the opening 17 adjacent to the wheel, the lever 24 of the units wheel will pass off the highest portion of the cam 22 adjacent to the first series, and the spring 29 will swing the lever to move the tens wheel a distance of one tooth so that instead of the numeral 2 at the opening of the tens wheel the numeral 3 will appear. The operator now engages the finger with that tooth of the tens wheel which is in register with the numeral 8 of the scale at the left and moves the wheel until his finger engages the concave surface 69.

The units wheel has already moved a distance of four teeth, including the tooth opposite the numeral 0 of the first series and there are but six teeth remaining, so that to complete the movement of eight teeth, the six teeth of the first series must pass below the opening 17 and in addition two teeth of the second series, namely those teeth at the numerals 0 and 1, and the numeral 1, will appear at the opening 17 adjacent to the tens wheel. As the numeral 0 passes beneath the opening 17 at the tens wheel, the lever 24 of the said wheel moves off the highest portion of the cam of the first series, and the spring 29 of the said lever swings the lever to cause the lever to advance the hundreds wheel a distance of one tooth.

The numeral 6 will now appear at the opening of the hundreds wheel. Seven teeth of the first series of the hundreds wheel have already passed below the opening 17, and there are but three remaining. When the operator moves the hundreds wheel a distance of nine teeth, three of the said teeth will complete the first series of numerals, and the remaining six teeth must be in the second series, so that the numerals 1, 2, 3 and 4 will pass the openings 17, leaving the numeral 5 visible at the said opening.

As the 0 between the first and the second series of numerals on the hundreds wheel passes the opening 17, the lever 24 adjacent thereto will swing to advance the thousands wheel and the numeral 5 will now appear at the opening adjacent thereto. The operator now engages the tooth of the thousands wheel which is opposite the numeral 2 at the scale at the left and moves the said wheel until his finger engages the surface 69, and the numeral 7 will appear at the opening 17 adjacent to the wheel.

The numeral 6 is at the opening of the ten-thousands wheel and placing his finger on that tooth which registers with the numeral 7, he will move the wheel as before described. Since there are but four teeth of the first series remaining, three teeth of the second series will move past the opening 17, and the numeral 3 will appear at the opening. As the 0 of the second series of numerals passes beneath the opening 17, the hundred-thousands wheel will be moved one tooth, and the numeral 1 will appear at the opening 17. Thus the total reading of the six wheels is 137,510.

I claim:—

1. In an adding machine, the combination with the shaft, and the number wheels journaled on the shaft, each wheel having an annular series of teeth, and a series of cams, a lever pivoted adjacent to each wheel and engaging the cams to move the lever in one direction, a spring normally acting to move the lever in the other direction, a pawl arm on the shaft and engaging the teeth of the succeeding wheel to move the said wheel when the lever is released from the cam, and a momentum arrester in connection with each pawl arm for positively locking the wheel from movement and operated by the lever, each of the said arresters comprising an arm journaled on the shaft and having means for engaging the adjacent pawl arm to lock the wheel from movement, a spring engaging the arm and acting normally to move the arm in a direction to disengage the pawl arm, and a lost motion connection between each arm and the lever of the preceding wheel for causing the said arm to engage the pawl arm to prevent movement of the wheel in either direction.

2. In an adding machine, the combination with the shaft, and the number wheels journaled on the shaft, each wheel having an annular series of teeth, and a series of cams, a lever pivoted adjacent to each wheel and engaging the cams to move the lever in one direction, a spring normally acting to move the lever in the other direction, a pawl arm on the shaft and engaging the teeth of the succeeding wheel to move the said wheel when the lever is released from the cam, and a momentum arrester in connection with each pawl arm for positively locking the wheel from movement and operated by the lever.

3. In an adding machine, a series of coaxial number wheels, each wheel having means for engagement by the operator to move the same in one direction, a lever pivoted intermediate its ends adjacent to each wheel, each lever having means at its lower end for engaging the succeeding wheel to move the wheel a distance of one tooth when the lever is swung on its pivotal connection in one direction, a spring for swinging the lever in such direction, means in connection with the first-named wheel for moving the lever in the other direction, and means adjacent to each wheel for engaging the engaging means of the lever to lock the wheel from movement, and a connection between each of the said means and the lever of the preceding wheel for operating the said means.

4. In an adding machine, a series of coaxial number wheels, each wheel having means for engagement by the operator to move the same in one direction, a lever pivoted intermediate its ends adjacent to each wheel, each lever having means at its lower end for engaging the succeeding wheel to move the wheel a distance of one tooth when the lever is swung on its pivotal connection in one direction, a spring for swinging the lever in such direction, means in connection with the first-named wheel for moving the lever in the other direction, and means adjacent to each wheel and operated by the lever for locking the wheel from movement in either direction.

JOHN WARING WITSELL.

Witnesses:
C. E. BURN,
S. T. CALDWELL.

Copies of this patent may be obtained for five cents each, by addressing the "Commissioner of Patents, Washington, D. C."